(12) United States Patent
Callway

(10) Patent No.: US 8,200,044 B2
(45) Date of Patent: Jun. 12, 2012

(54) IMAGE ANALYSER AND ADAPTIVE IMAGE SCALING CIRCUIT AND METHODS

(75) Inventor: Edward George Callway, Toronto (CA)

(73) Assignee: Broadcom Corporation, Irvine, CA (US)

( * ) Notice: Subject to any disclaimer, the term of this patent is extended or adjusted under 35 U.S.C. 154(b) by 1161 days.

(21) Appl. No.: 11/619,358

(22) Filed: Jan. 3, 2007

(65) Prior Publication Data

US 2007/0152990 A1  Jul. 5, 2007

Related U.S. Application Data

(60) Provisional application No. 60/755,084, filed on Jan. 3, 2006.

(51) Int. Cl.
*G06K 9/32* (2006.01)

(52) U.S. Cl. ......... 382/298; 348/448; 348/452; 358/1.2; 358/434; 382/159; 382/173; 382/176; 382/239; 382/261; 382/270; 382/299; 382/300; 706/13

(58) Field of Classification Search .................. None
See application file for complete search history.

(56) References Cited

U.S. PATENT DOCUMENTS

| | | | | | |
|---|---|---|---|---|---|
| 5,528,704 | A | * | 6/1996 | Parker et al. ................. | 382/299 |
| 5,754,710 | A | * | 5/1998 | Sekine et al. ................. | 382/300 |
| 5,815,596 | A | * | 9/1998 | Ahuja et al. ................. | 382/173 |
| 5,850,475 | A | * | 12/1998 | Kasao ............................. | 382/173 |
| 5,861,960 | A | * | 1/1999 | Suzuki et al. ................. | 382/239 |
| 6,055,340 | A | * | 4/2000 | Nagao ............................ | 382/261 |
| 6,137,541 | A | * | 10/2000 | Murayama ..................... | 348/673 |
| 6,240,206 | B1 | * | 5/2001 | Tokuyama et al. ........... | 382/176 |
| 6,272,479 | B1 | * | 8/2001 | Farry et al. ...................... | 706/13 |
| 6,333,792 | B1 | * | 12/2001 | Kimura .......................... | 358/1.2 |
| 6,437,881 | B1 | * | 8/2002 | Baba et al. .................... | 358/434 |
| 6,567,568 | B1 | * | 5/2003 | Nabeshima et al. .......... | 382/300 |
| 7,139,442 | B2 | * | 11/2006 | Ebner et al. ................... | 382/299 |

(Continued)

FOREIGN PATENT DOCUMENTS

EP  0 771 119  5/2003

(Continued)

OTHER PUBLICATIONS

International Search Report, for International Patent Application No. PCT/IB2007/000006, filed Jan. 30, 2007.

(Continued)

*Primary Examiner* — Anand Bhatnagar
*Assistant Examiner* — Tsung-Yin Tsai
(74) *Attorney, Agent, or Firm* — Thomas, Kayden, Horstemeyer & Risley, LLP

(57) ABSTRACT

An image analyser analyses regions of an image. An image scaler may then scale the image adaptively, in dependence on the nature of region of the image being scaled. In one embodiment, adjacent pixels are analysed to determine their frequency content. This frequency analysis provides an indication of whether the pixels likely contain hard edges, discontinuities or variations typical of computer generated graphics. As a result of the analysis, the type of scaling suited for scaling the image portion containing the pixels may be assessed. Adjacent pixels having high frequency components may be scaled by a scaling circuit that introduces limited ringing. Adjacent pixels having lower frequency components may be scaled using a higher-order multi-tap scaler. Resulting scaled pixels may be formed as a blended combination of the two different scaling techniques.

20 Claims, 10 Drawing Sheets

U.S. PATENT DOCUMENTS

| | | | |
|---|---|---|---|
| 7,379,594 B2 * | 5/2008 | Ferman et al. | 382/176 |
| 2002/0064307 A1 * | 5/2002 | Koga et al. | 382/176 |
| 2002/0172434 A1 | 11/2002 | Freeman et al. | |
| 2004/0114832 A1 * | 6/2004 | Ebner et al. | 382/298 |
| 2004/0135926 A1 * | 7/2004 | Song et al. | 348/448 |
| 2007/0036429 A1 * | 2/2007 | Terakawa | 382/159 |
| 2007/0052845 A1 * | 3/2007 | Adams | 348/452 |

FOREIGN PATENT DOCUMENTS

| | | |
|---|---|---|
| EP | 1 329 847 | 7/2003 |

OTHER PUBLICATIONS

Jack, Keith. "Video Demystified: A Handbook for the Digital Engineer". 2005, pp. 231-240, Elsevier Inc., 4th ed.: Burlington, MA.

Wolberg, George. "Digital Image Warping". 1990, pp. 117-146, IEEE Computer Society Press: Los Alamitos, CA.

Poynton, Charles. "Digital Video and HDTV Algorithms and Interfaces", 2003, pp. 171-185, Morgan Kaufmann Publishers: San Francisco, CA.

* cited by examiner

IMAGE ANALYSER AND ADAPTIVE IMAGE SCALING CIRCUIT AND METHODS

CROSS-REFERENCE TO RELATED APPLICATION

This application claims benefits from U.S. provisional application Ser. No. 60/755,084 filed Jan. 3, 2006, the entire contents of which are hereby incorporated herein by reference.

FIELD OF THE INVENTION

The present invention relates generally to the digital images processing, and more particularly to a method of assessing the nature of portions of an image and scaling such image.

BACKGROUND OF THE INVENTION

Processing of digital video presents many challenges. One of these is scaling the video images to different sizes. Image scaling is typically required to convert the size of an image, stored or received in one format into a different size desired or required by a viewer of the image.

Many techniques for scaling digital video are known. Some of these are disclosed in Keith Jack, Video Demystified, Fourth Edition (Demystifying Technology) (Newnes: 2004), the contents of which are hereby incorporated by reference. Others are disclosed in Digital Image Warping, George Wolberg, (IEEE Computer Society Press, Los Alamitos, Calif.: 1990).

Each technique presents its advantages and drawbacks. For example, fast scaling techniques repeat or sub-sample pixels within a source image to form a scaled image. These techniques are well suited for scaling low detail source images, or source images with very clearly defined edges. For example, such techniques are used to scale computer generated graphics. However, they may leave some scaled images looking blotchy.

Other techniques combine multiple adjacent pixels to form the scaled image, typically using a polyphase multi-tap filter. These techniques are well suited for high detail images. Generally, the more pixels that are combined, the less blotchy the resulting image. As a result, such techniques are used to scale camera images. These techniques, however, often introduce other undesirable artefacts in the scaled image. For example, if too many adjacent pixels are combined the resulting scaled image may inappropriately combine pixels in unrelated portions of the source image. Moreover, if sharp edges are combined in such a multi-tap filter, ringing may occur.

The recent convergence of computer graphics and real video has exacerbated the shortcomings of existing scaling circuits. Specifically, modern video such as encoded using an MPEG-2 or similar codecs combines camera images with text and graphics. Using a low order scaling circuit blurs the camera image portion of the video, while using higher order scalers results in ringing caused by the presence of computer graphics.

Accordingly, there is a need for an improved scaling circuit and method.

SUMMARY OF THE INVENTION

In accordance with the present invention, regions of an image are analysed. An image scaler may then scale the image adaptively, in dependence on the nature of region of the image being scaled. In one embodiment, adjacent pixels are analysed to determine their frequency content. This frequency analysis provides an indication of whether the pixels likely contain computer generated graphics. Typically, computer generated graphics include hard edges, discontinuities or variations that, in turn, have a broad spectral content in the frequency domain. As a result of the analysis, the type of scaling suited for scaling the image portion containing the pixels may be assessed. High frequency content is typically representative of the broad spectral content. Adjacent pixels having high frequency components may, for example, be scaled by a scaling circuit that introduces limited ringing. Adjacent pixels having lower frequency components may be scaled using multiple adjacent pixels, by for example, a higher-order multi-tap scaler. Resulting scaled pixels may be formed as a blended combination of the two different scaling techniques.

In accordance with an aspect of the present invention, there is provided a method of detecting whether a plurality of pixels of a digital image include computer generated graphics, comprising analysing groups of adjacent pixels in the plurality of pixels to assess the frequency content of the plurality of adjacent pixels.

In accordance with another aspect of the present invention, there is provided a method of adaptively scaling pixels in an image, comprising analysing groups of adjacent pixels in the image to assess the frequency content of the groups of adjacent pixels, forming a scaled output dependent on the analysing to scale the image proximate each of the groups.

In accordance with yet another aspect of the present invention there is provided a method of assessing whether a plurality of values of adjacent pixels represents computer generated graphics, comprising, analysing the plurality of values to determine if the plurality of values contain frequency components representative of computer generated graphics.

In accordance with yet another aspect of the present invention, there is provided a method of forming an output pixel value used in scaling an image, the method comprising: combining a first plurality of adjacent pixels in the image to produce a first scaled pixel value; combining a second plurality of adjacent pixels in the image to produce a second scaled pixel value; blending the first scaled pixel value and the second scaled pixel value to form the output pixel, wherein the relative contribution of the first scaled pixel value and the second pixel value in the output pixel is adjusted in dependence on a frequency analysis of pixels in the first plurality of pixels.

In accordance with yet another aspect of the present invention, there is provided an image scaling circuit comprising, a buffer for storing m adjacent pixels in the image; an analysis block for determining if the m adjacent pixels contain defined frequency components; a first scaler in communication with the buffer for combining ones of the m adjacent pixels to form a first scaled pixel value; a second scaler in communication with the buffer for combining ones of the m adjacent pixels to form a second scaled pixel value; an output providing a scaled pixel output from the first scaled pixel value and the second scaled pixel value and formed in dependence on the output of the analysis block.

In accordance with yet another aspect of the present invention, there is provided an image analyser for a display unit comprising: a port for receiving a plurality of values corresponding to a set of contiguous pixels for the display unit, a pattern detector for detecting at least one defined pattern in the contiguous pixels, the pattern detector operable to classify the nature of the contiguous pixels, using less than five of the contiguous pixel.

In accordance with yet another aspect of the present invention, an image scaling circuit comprises a buffer for storing m adjacent pixels in the image; a scaler in communication with the buffer for combining ones of the m adjacent pixels to form a scaled pixel value; an analysis block for determining if the m adjacent pixels contain defined frequency components. The analysis block in communication with the scaler to vary coefficients of the scaler in dependence on the output of the analysis block.

In accordance with yet another aspect of the present invention, an image scaling circuit comprises a buffer for storing m adjacent pixels in the image; a filter in communication with the buffer to filter the m adjacent pixels to produce n filtered pixels; and an analysis block for determining if the m adjacent pixels contain defined frequency components. The analysis block is in communication with the filter to vary parameters of the filter in dependence on the output of the analysis block. A scaler scales the n filtered pixels.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
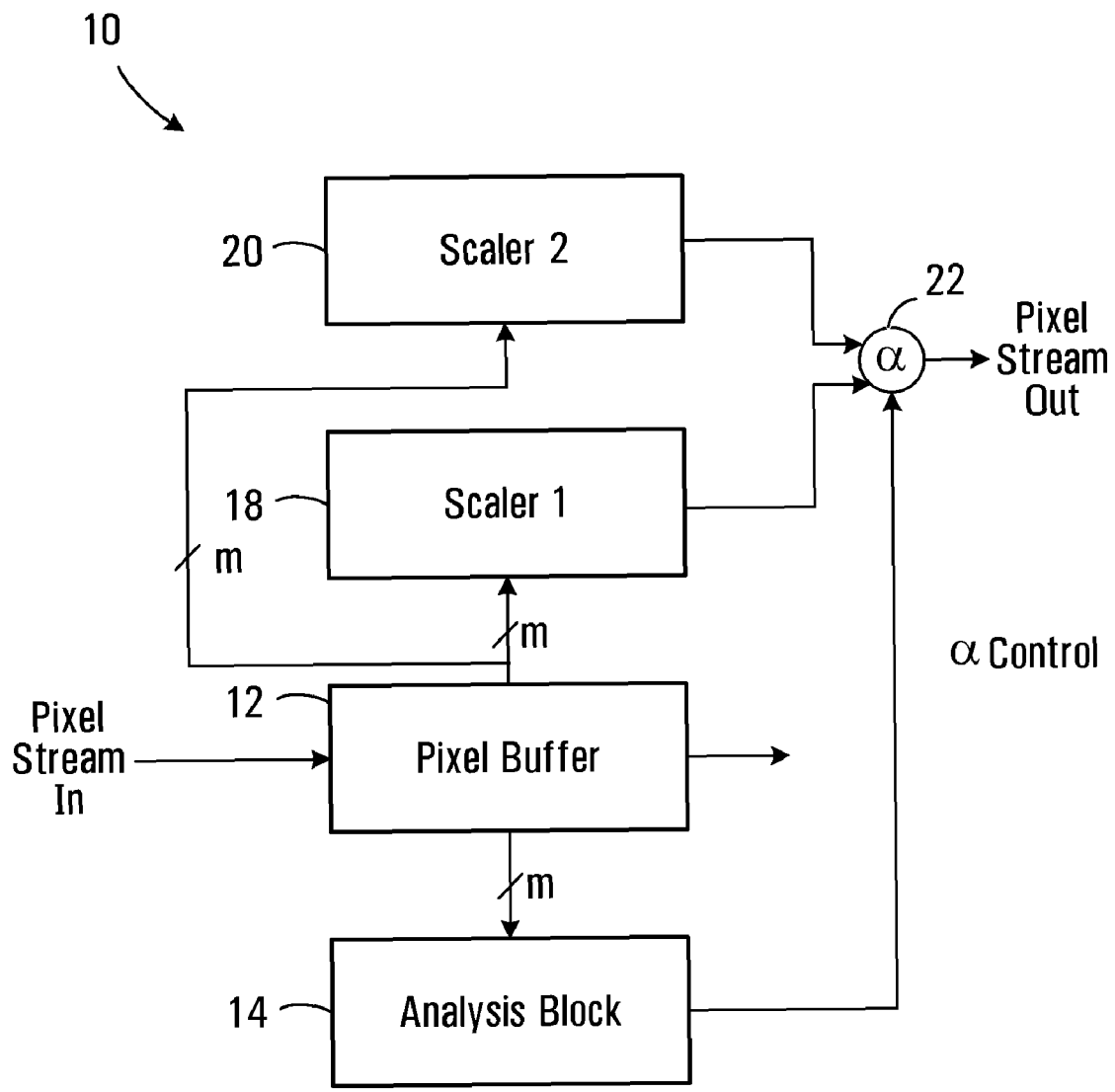
FIG. 1 is a simplified block diagram of an image analysis and scaling circuit, exemplary of an embodiment of the present invention.

FIG. 1 illustrates an image analysis and scaling circuit 10 exemplary of an embodiment of the present invention. As illustrated, analysis and scaling circuit 10 includes a pixel buffer 12 suitable for buffering a plurality of pixel values in a row or column of a rasterized image. Pixel buffer 12 receives adjacent pixels, typically in a row or column of an image. Pixel buffer 12 is in communication with analysis block 14 and is further in communication with two separate pixel scalers 18 and 20. Scalers 18 and 20 each combine selected pixels of pixel buffer 12 in order to each form a scaled version of the line or column within pixel buffer 12. Scalers 18 and 20 thus form two possible scaled versions of adjacent pixels within pixel buffer 18. An alpha-blender 22 combines the individual outputs of scalers 18 and 20. The operation of the alpha-blender 22 is controlled by analysis block 14.

As will become apparent, analysis and scaling circuit 10, analyses portions of an image, and up-scales or down-scales the size of the image in a manner dependent on the analysis. Scaling circuit 10 may operate as a horizontal scaling circuit, operating on pixels in a row of an image or as a vertical scaling circuit, operating on pixels in a column of the image. Scaling circuit 10 may operate on individual color components of pixels or simultaneously on multiple components of a pixel.

Figure 2:
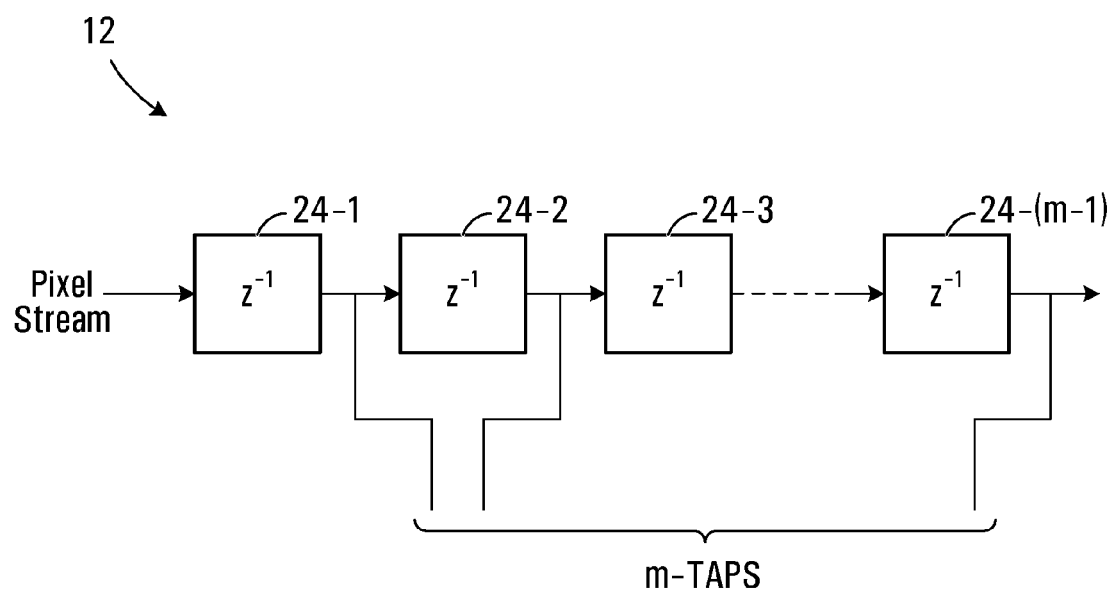
FIG. 2 is a simplified block diagram of a pixel buffer forming part of the circuit of FIG. 1.

An example pixel buffer 12 is schematically in FIG. 2. Pixel values to be scaled are stored within m pixel buffer 12. As illustrated, pixel buffer 12 includes an input port, and acts as a first-in-first out buffer, and includes sufficient storage elements to at least store the maximum number of pixels required to combine adjacent pixels to form the scaled image. In the depicted embodiment, pixel buffer 12 includes m delay blocks 24-1-24-(m-1) (individually and collectively delay blocks 24), each acting as a storage element to store one of m pixel values that are typically vertically or horizontally adjacent to each other in the original image. The size of each storage element will depend on the nature of the pixel values being scaled. For example, if 32 bit RGB pixels are being scaled, each storage element may store 32 bits. Of course, an image processor may include multiple scaling circuits of the form of circuit 10 in order to concurrently scale multiple color components or to scale the image vertically and horizontally.

Each image scaler 18 and 20 depicted in FIG. 1 combines one or more pixels in buffer 12, in order to form a single pixel to be used in an image, typically having a size differing from the size of the original image. As such, example pixel buffer 12 includes m storage locations, each one providing the value of one of delay blocks 24. The maximum number of pixels combined by either scaler 18 or 20 to form a scaled pixel value typically will not exceed m, the number of storage locations within buffer 12. Of course, fewer than m pixels could be used to form a scaled pixel value.

In the depicted embodiment, image scaler 18 and image scaler 20 are of different order or type, and thus each form a different version of pixels within buffer 12, to be scaled. Scalers 18 and 20 may, for example, be multi-tap scalers averaging a plurality of adjacent pixels. The number of taps and/or coefficients of scaler 18 may differ from the number of taps and/or coefficients of scaler 20.

Multi-tap scalers are for example disclosed in Video Demystified, supra and Digital Video and HDTV Algorithms and Interfaces, supra. As will be understood by a person of ordinary skill, a multi-tap scaler generates a weighted sum of adjacent pixels to form a scaled pixel value. The number of adjacent pixels that are combined is governed by the number of taps of the scaler. A multi-tap scaler is typically clocked at a rate different than the rate of pixels arriving in buffer 12. As such, in order to scale an image by a factor of M:N a scaler (like scaler 18, 20) outputs M pixels for each N pixels arriving at buffer 12. A suitable multi-tap scaler may use multiple sets of scaling coefficients depending on the ratio of M:N.

Alternatively, scaler 20 may be a multi-tap scaler, while scaler 18 may simply repeat or sub-sample pixels in order to scale. In any event, scaler 18 is more suitable for scaling video having high frequency components, as scaler 18 causes less ringing when scaling such high frequency components.

Figure 3:
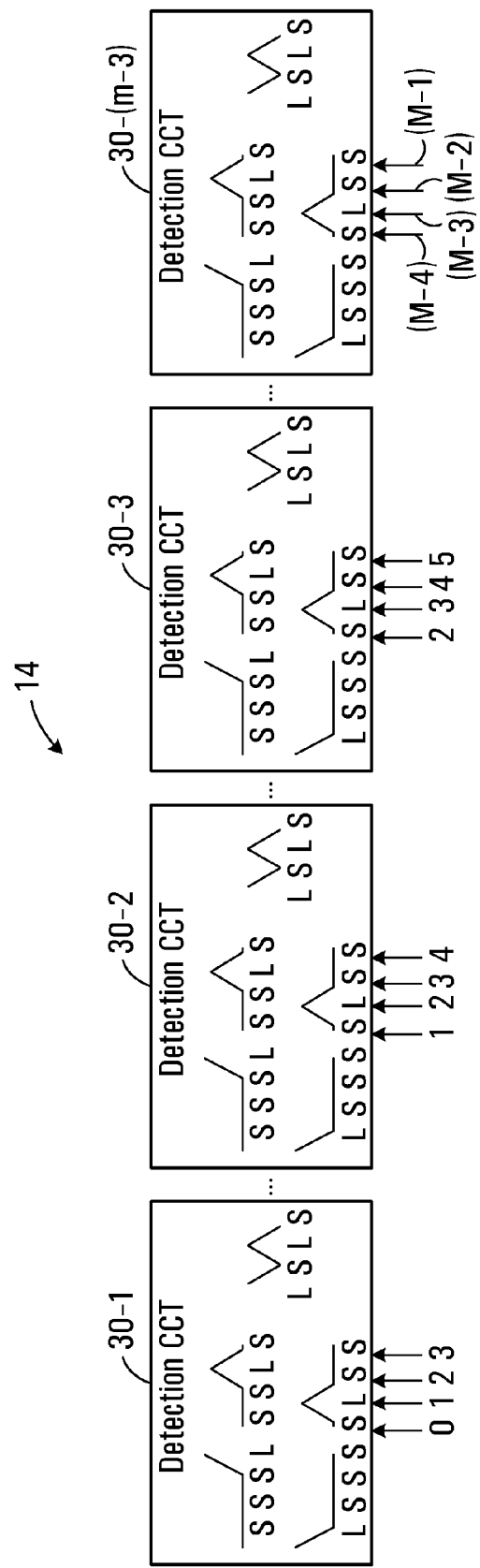
FIG. 3 is a simplified block diagram of an analysis block forming part of the image scaling circuit of FIG. 1.

Analysis block 14 is schematically depicted in FIG. 3. In the depicted embodiment, analysis block 14 operates in pixel space in order to assess whether the contents of pixel buffer 12 contains adjacent pixel values reflecting high frequency components in the original image.

Specifically, analysis block 14 analyses groups of adjacent pixel values within pixel buffer 12 in order to identify pixel patterns within buffer 12 that reflect the presence of high-frequency components in the row or column of pixels within buffer 12 and currently under analysis. Such high frequency components are often representative of computer generated graphics in the image. Computer generated graphics are typically characterised as synthetic image data generated by computation (as opposed to being acquired from a physical scene), and often include sharp edges and isolated pixels, reflected in high frequency (or broad) spectral content. In the example embodiment, analysis block 14 includes a plurality of detection circuits 30 that serve to analyze the multiple groups of adjacent pixels within buffer 12 to detect variations indicative of a high frequency image.

In the depicted embodiment, each detection circuit 30 is provided with the contents of adjacent delay blocks 24, and assesses whether groups of four adjacent pixels within pixel buffer 12 meet certain requirements. As detection circuits 30 wish to ensure that no four pixels within buffer 12 meet the requirements, a total of (m-3) detection circuits 30 form part of block 14. Each detection circuit 30 takes as inputs, four adjacent pixels values within buffer 12. With (m-3) detection circuits 30, every group of adjacent four pixels in m-pixel buffer 12 is analysed.

Each detection circuit 30 detects frequency components within buffer 12 that may represent sharp edges, impulses, or contrast variations at or about the Nyquist frequency of the source image. Sharp edges, impulses or contrast variations manifest themselves in rapid changes in relative pixel values. For example, a sharp edge manifests itself as three small pixel values followed by a larger pixel value (SSSL), or a large pixel value followed immediately by three small pixel values (LSSS). An impulse manifest itself as a small pixel value followed a large pixel value, and two or more small pixel values (SSLS) or (SLSS). Frequency components at or near the Nyquist frequency manifest themselves as alternating relatively small and large pixel values (e.g. SLSL or LSLS).

As such detection circuits 30 analyse groups of four pixels in buffer 12 to determine if any such groups have the following pixel patterns in adjacent pixels having values DCBA, SSSL, SSLS, SLSL, SLSS and LSSS where L and S represent relative large and small pixel values for each of DCBA.

At the same time, detection circuits 30 may detect symmetric reflections of the above patterns, such as LLLS, LSLS and SLLL.

Each detection circuit 30 according includes five functional analysis blocks 32a-32e, depicted in FIGS. 4A-4E.

Figure 4A:
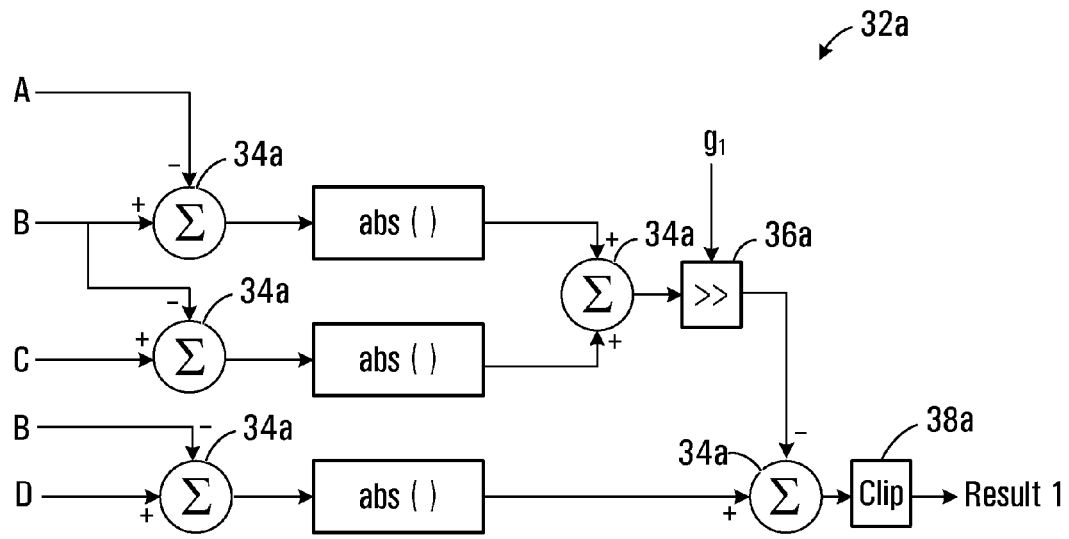
FIGS. 4A-4E are simplified of detection circuits forming part of the analysis block of FIG. 2.

As illustrated in FIG. 4A, a step pixel pattern SSSL may be detected by block 32a, using four summers 34a, arranged to calculate the $result_1=abs(D-B)-G_1(abs(B-A)+abs(C-B))$. Summers 34a may take the absolute values of inputs, as required. Optionally, the sum $(abs(B-A)+abs(C-B))$ may be amplified by a gain factor $G_1$, for example, by barrel shifter 36a, multiplier, or other suitable amplifying block. If $result_1$ is large, the SSSL pattern has been matched. If $result_1$ is small, the pattern is not present. Prior to output $result_1$ may be clipped to a maximum/minimum value by clipper 38a.

Figure 4B:
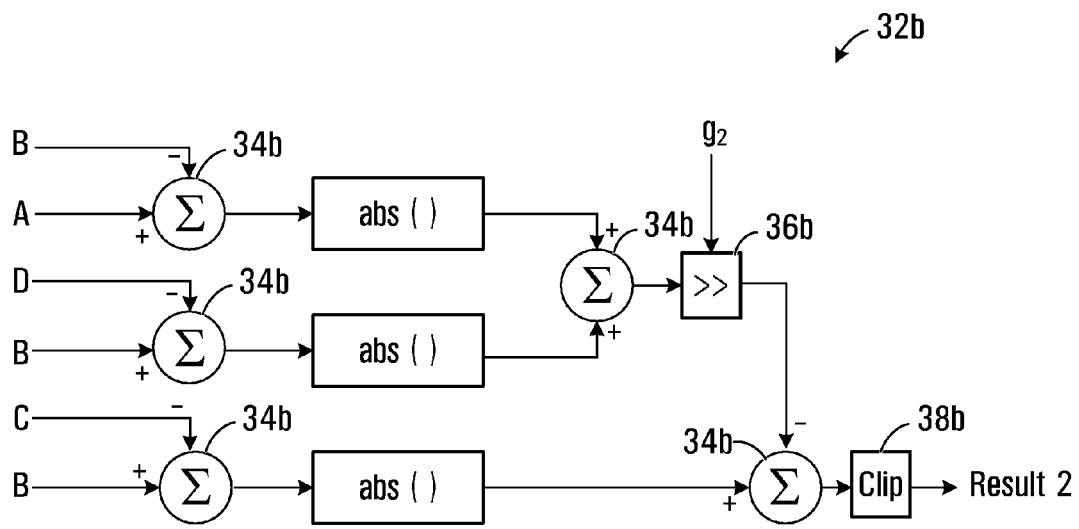

As illustrated in FIG. 4B, impulse pixel pattern SSLS may be detected by block 32b using four summers 34b, arranged to calculate the $result_2=abs(B-C)-G_2(abs(B-A)+abs(B-D))$. Optionally, the sum $(abs(B-A)+abs(B-D))$ may be amplified by a gain factor $G_2$ by barrel shifter 36b, multiplier, or other suitable amplifying block. If $result_2$ is large, the SSLS pattern has been matched. If $result_2$ is small, the pattern is not present. Again, prior to output, $result_2$ may be clipped to a maximum/ minimum value by clipper 38b.

Figure 4C:
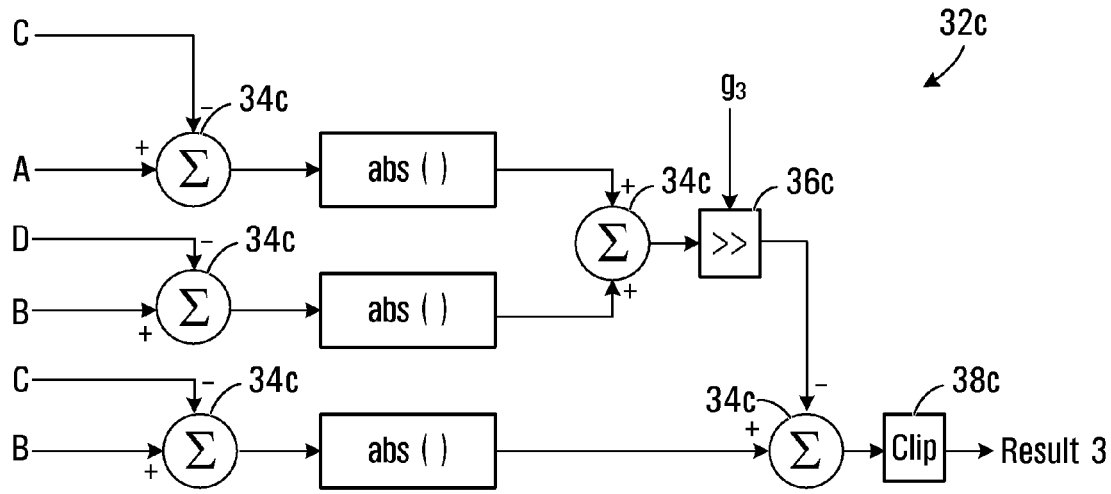

As illustrated in FIG. 4C, Nyquist pixel pattern SLSL may be detected by block 32c using four summers 34c arranged to calculate $result_3=abs(B-C)-G_3(abs(A-C)+abs(B-D))$. Summers 34c may take the absolute values of inputs, as required. Optionally, the sum $(abs(A-C)+abs(B-D))$ may be amplified by a gain factor $G_3$ by barrel shifter 36c, multiplier, or other suitable amplifying block. If $result_3$ is large, the SLSL pattern has been matched. If $result_3$ is small, the Nyquist pixel pattern is not present. Prior to output, $result_3$ may be clipped to a maximum/minimum value by clipper 38c.

Figure 4D:
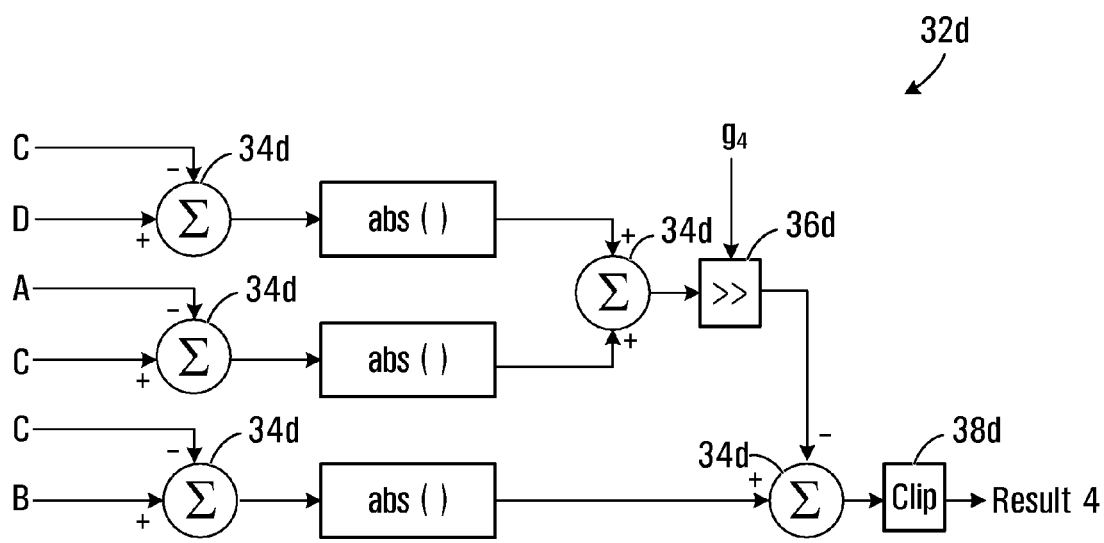

As illustrated in FIG. 4D, impulse pixel pattern SLSS may be detected by block 32d using four summers arranged to calculate $result_4=abs(B-C)-(abs(A-C)+abs(C-D))$. Optionally, the sum $(abs(A-C)+abs(C-D))$ may be amplified by a gain factor $G_4$ by barrel shifter 36d, multiplier, or other suitable amplifying block. If $result_4$ is large, the SLSS pattern has been matched. If $result_4$ is small, this impulse pattern is not present. Once again, prior to output, $result_4$ may be clipped to a maximum/minimum value by clipper 38d.

Figure 4E:
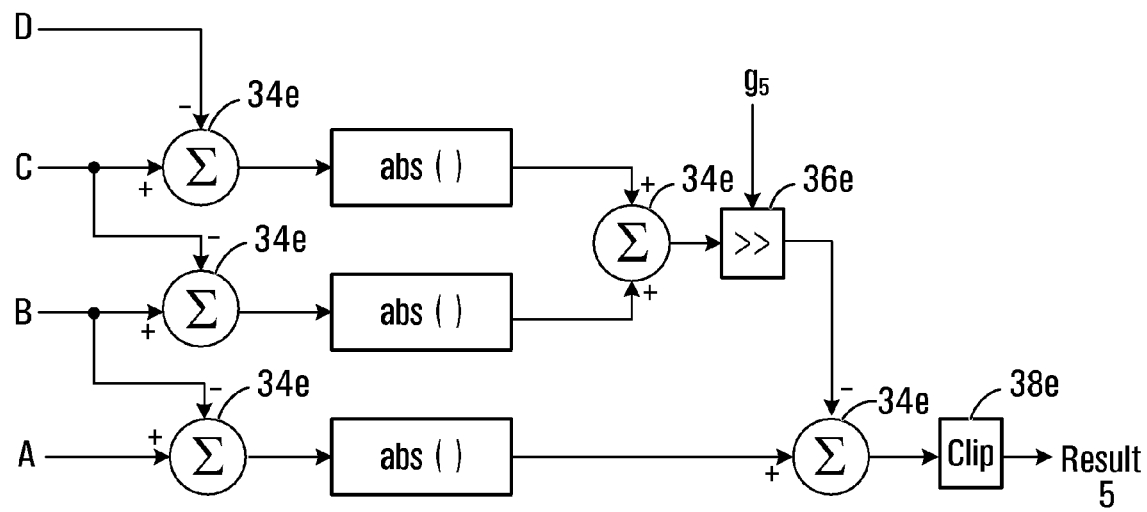

Step pixel pattern LSSS may be detected by block 32e using four summers, arranged to calculate the $result_5=abs(A-B)-(abs(B-C)+abs(C-D))$, as illustrated in FIG. 4E. Summers 34e may take the absolute values of inputs, as required. Optionally, the sum $(abs(B-A)+abs(C-D))$ may be amplified by a gain factor $G_5$ by barrel shifter 36e, multiplier, or other suitable amplifying block. If $result_5$ is large, the SSSL pattern has been matched. If $result_5$ is small, the pattern is not present. Once again, prior to output, $result_5$ may be clipped to a maximum/minimum value by clipper 38e.

Figure 5A:
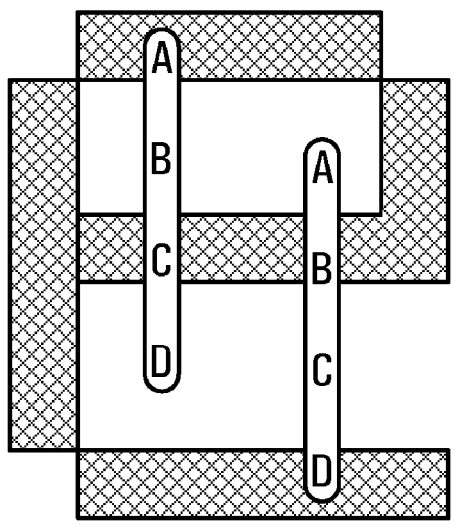
FIGS. 5A-5D depict computer generated graphics detected by detection blocks of FIGS. 4A-4E.
Figure 5B:
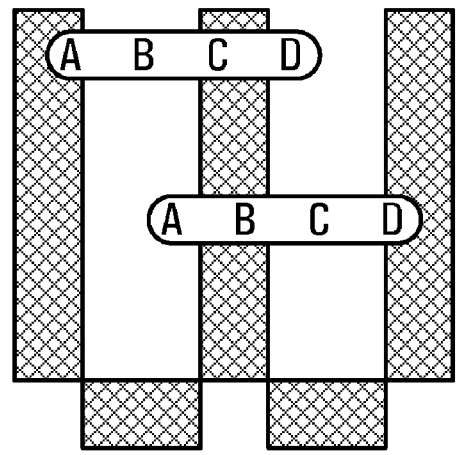
Figure 5C:
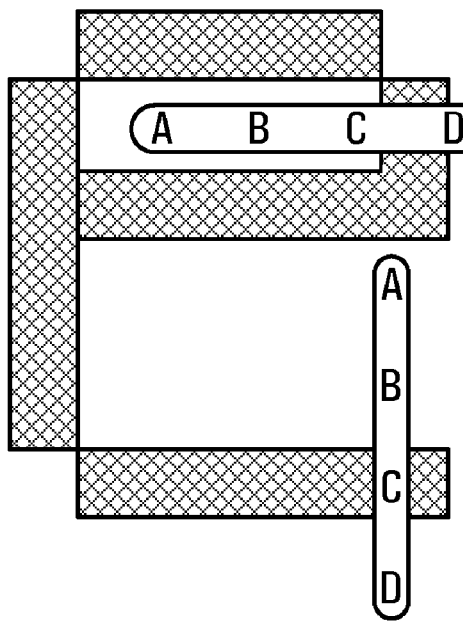
Figure 5D:
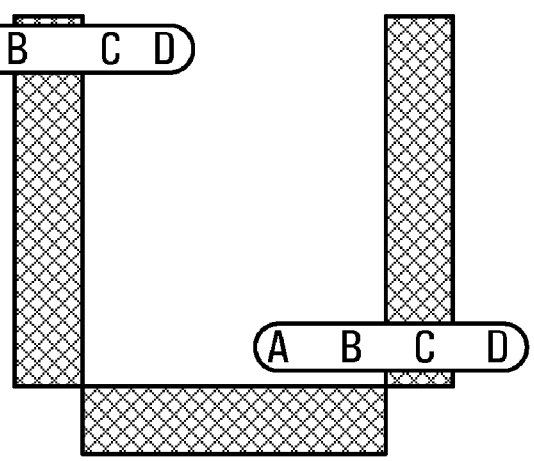

Example pixel patterns detected by detection blocks 32a-32e are illustrated in FIGS. 5A-5D. As illustrated in FIGS. 5A and 5B, the computer generated letters "e" and "w" contain the SLSL pattern detected by detection circuit 32c. As illustrated in FIGS. 5C and 5D, the computer generated letters "e" and "u" include patterns reflecting impulses and steps detected by detection circuits 32a, 32b, 32d and 32e.

Summers 34a may be formed as conventional adders, having a bit capacity sufficient to accommodate pixel values in buffer 12. As many summers 34a, 34b, 34c, 34d and 34e serve the same purpose, some summers 34 illustrated in FIGS. 4A-4E and used as part of a single detection circuit 30 may be shared or combined.

Notably, each circuit 30 generates five output values ($result_1$ to $result_5$). If any of these five values has a relatively large value, one of the pixel patterns identified above and indicative of a high frequency component in the four pixels being analysed by that circuit 30, has been detected. If any one of (m-3) circuits 30 forming part of block 14 produces a large value, the pixels within buffer 12 contain at least some high frequency components. The greater the result value, the higher the highest frequency component within pixel values in buffer 12.

Now, scaler 20 scales pixels within buffer 12 as if pixels contained no or few high frequency components to generate a scaled pixel value $pixel_{scaler2}$. An example scaler 20, suitable for scaling an image horizontally may be a sixteen tap scaler. An example scaler 20, suitable for scaling an image vertically may be a six tap scaler. Scaler 20 may, for example, be formed as a polyphase finite impulse response (FIR) filter, to interpolate pixels about the center pixel within buffer 12. Scaler 18 scales the same pixels within buffer 12 as if these were generated by a computer and as if they contain high frequency components to generate a scaled pixel value $pixel_{scale1}$. For example, scaler 18 may be a lower order scaling circuit, such as an m/2-tap or two-tap polyphase scaling circuit.

In one embodiment, which of $pixel_{scale1}$, and $pixel_{scale2}$ is used to represent the output value of scaler 10 could be selected depending on the maximum value of the 5*(m-3)

outputs, result$_1$, to result$_5$, output by detection circuits 30. If the maximum exceeds a threshold, pixel$_{scale2}$ could be used; otherwise pixel$_{scale1}$ could be used.

Alternatively, as depicted in the embodiment of circuit 10 of FIG. 1, the resulting scaled pixels may be provided to an alpha-blender 22, that forms a scaled output pixel, $$pixel_{out}=\alpha*pixel_{scale1}+(1-\alpha)*pixel_{scale2}.$$

The value of α (and thus the contribution of pixel$_{scale1}$ and pixel$_{scale2}$ to pixel$_{out}$) may be output by analysis block 14, and may be a function of the largest of the 5*(m-3) calculated outputs, result$_1$ to result$_5$, for detection blocks 30.

α may, for example, be calculated in block 14 as $$\alpha=\text{max}(result_1 \text{ to } result_5)/\text{maximum possible result}$$

Sequential values of pixel$_{out}$ may be combined to form the scaled image. The output pixels may be stored in memory or a frame buffer for display.

Figure 6:
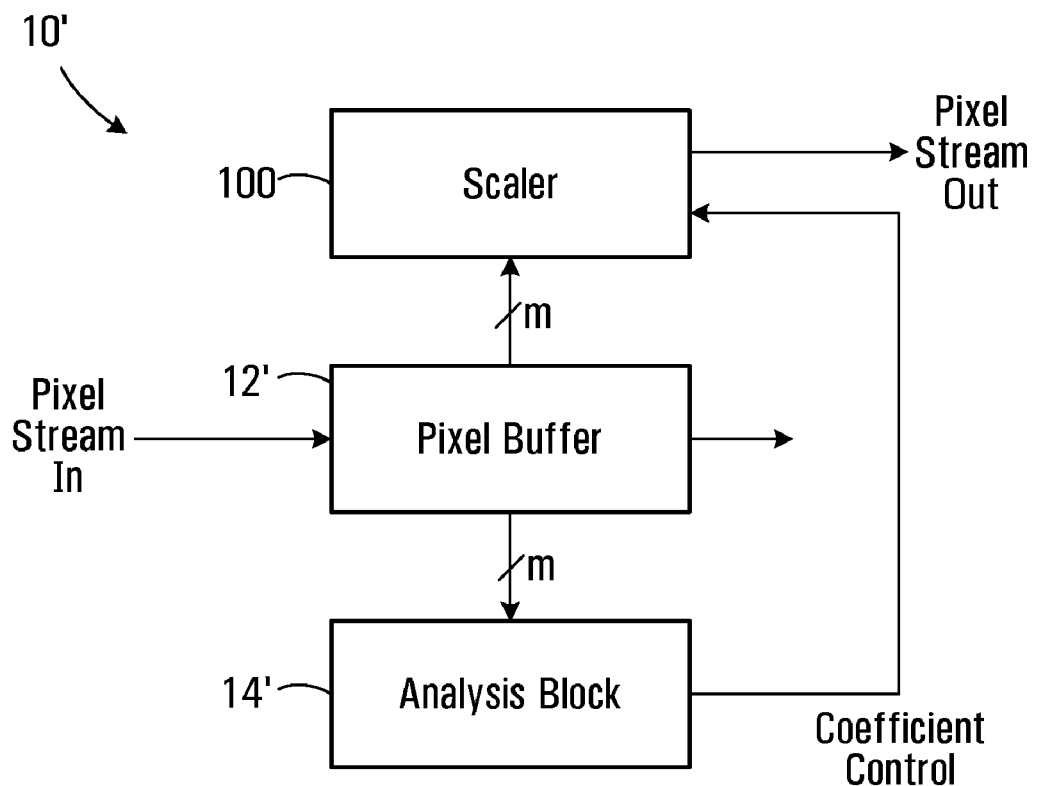
FIG. 6 is a simplified block diagram of an image analysis and scaling circuit, exemplary of another embodiment of the present invention.
Figure 7:
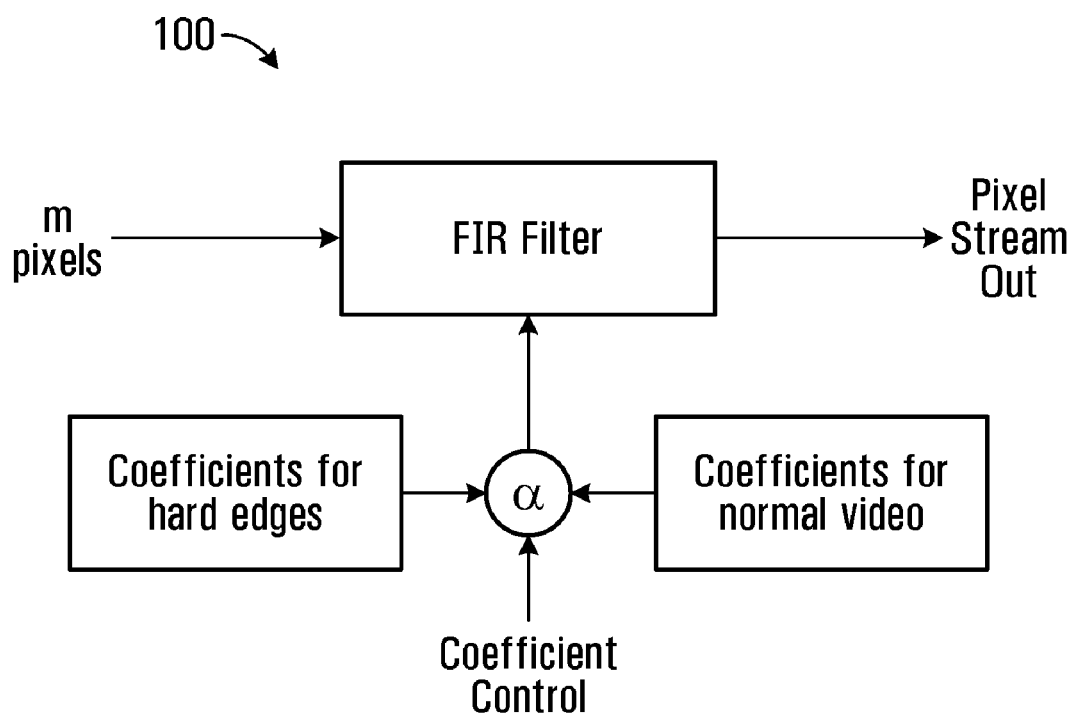
FIG. 7 is a simplified block diagram of an adaptive FIR filter, used as a scaler in the image analysis and scaling circuit of FIG. 6.

In an alternate embodiment depicted in FIG. 6, an image analysis and scaling circuit 10' includes an analysis block 14' (like analysis block 14 of FIG. 1), in communication with a m pixel, pixel buffer 12' (like pixel buffer 12 of FIG. 1), and a single scaler 100 that provides the output pixel stream. Scaler 100 is adaptive, and may be a polyphase filter of order m (or less), such as FIR filter of order m. As such, scaler 100 may combine the m pixels in buffer 12' to form an output pixel. Coefficients of scaler 100 may be changed in dependence on the output of analysis block 14'. For example, if analysis block 14' detects high frequency components, filter coefficient values may be chosen to create low pass filter. On the other hand, in the absence of high frequency components, coefficients may be changed to form a broad band, high order filter. Suitable coefficients may be stored in memory that may be part of scaler 100, or separate therefrom (not shown). Coefficients may be selected from this memory based on the value of output by analysis block 14'. Alternatively, coefficients may be calculated with each output of analysis block 14'. A single set of coefficients for use in scaler 100, may, for example, be equivalent to coefficient values used for scalers 18, 20, blended to a degree dependent on the output of analysis block 14'. Such coefficients could be stored in memory, or could be calculated with each output. An example scaler 100 that blends two sets of coefficients in dependence on the output of analysis block 14' is depicted in FIG. 7.

Figure 8:
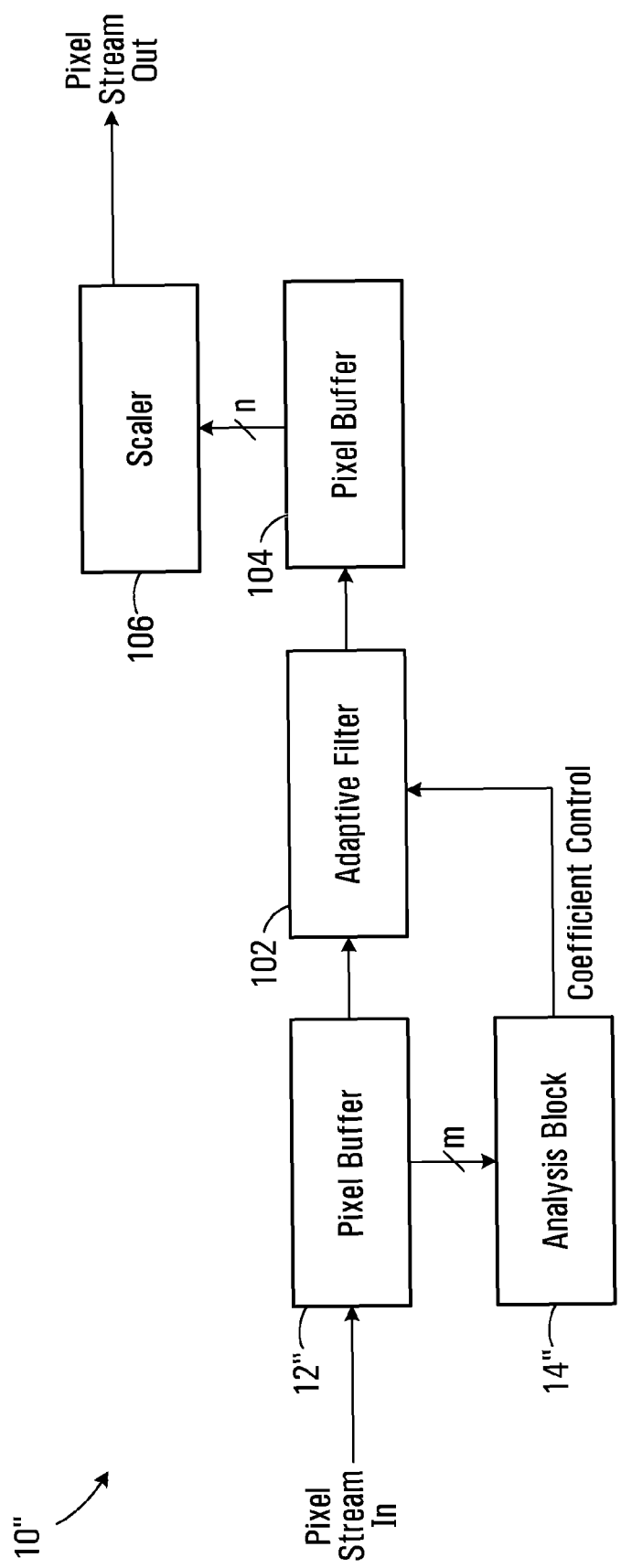
FIG. 8 is a simplified block diagram of an image analysis and scaling circuit, exemplary of yet another embodiment of the present invention.

In yet a further embodiment depicted in FIG. 8, an image analysis and scaling circuit 10" includes analysis block 14" (like analysis blocks 14 and 14') in communication with a m pixel, pixel buffer 12". A filter 102, receives values from pixel buffer 12" (like buffer 12 and 12'). Filter 102 may be a FIR filter, of order m. The coefficients of filter 102 may again be adjusted in dependence on the value of the output analysis block 14". The output of filter 102 may then be provided to a second pixel buffer 104, in communication with a second scaler 106, whose coefficients are preferably time invariant. Filter 102 may remove or reduce hard edges in the pixels in buffer 12". For example, filter 102 may remove signal components that could cause ringing in a downstream scaler 106. Filter 102 can be as simple as a filter of less than four taps (e.g. a two or three tap FIR filter) with controllable coefficients, or a FIR filter with a coefficients that are blended in dependence on the output of analysis block 14", formed in much the same way as scaler 100 (FIG. 7), but using different coefficients, and of lower order (e.g. of order three, instead of m). Example coefficients for the use in such a filter 102 (formed in the same way as scaler 100 of FIG. 7) could be [0,1,0] for normal video, and [0.25, 0.5, 0.25] for hard edges. Many other suitable coefficients, and how to arrive at them, will be appreciated by those of ordinary skill. Pixels in buffer 104 are a delayed version of pixels in buffer 12" and are delayed to match the processing delay in analysis block 14" and filter 102. The width of filter 102 and scaler 106, may be different or the same, but should be centered about the same pixel.

As noted, analysis and scaling circuit 10, 10' and 10" may be formed as part of a video processor suitable for use in a computer, television, flat panel monitor, media player (including DVD, PVR or the like), in a camera, or other device requiring the display of digitized images. Scaling circuit 10 may be formed using conventional integrated circuit manufacturing and design techniques.

In the depicted embodiment, analysis block 14 operates in pixel space. In alternate embodiments, analysis block 14 could operate in frequency space, by for example, performing a Fourier or wavelet analyses on pixels in pixel buffer 12 to determine their frequency content, and hence the nature of the pixels, and their likely origin (e.g. computer generated, or not).

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of assessing whether a plurality of values of adjacent pixels represents computer generated graphics, comprising:
    analyzing said plurality of values to determine if said plurality of values contain frequency components representative of computer generated graphics; and
    providing an output indicating whether said plurality of pixels include one of either computer generated graphics or an image acquired from a physical scene based on the frequency content of the plurality of adjacent pixels; and
    wherein said analyzing comprises determining if said plurality of values includes a pixel value pattern indicative of one of a step, an impulse, or variations at about the sampling rate of said plurality of values by comparing groups of adjacent ones of said plurality of values to defined patterns representative of a step, an impulse, or variations at about the sampling rate of said plurality of values, each of said groups of adjacent ones of said plurality of values comprises values, A, B, C and D, of four adjacent pixels in said image, and analyzing comprises forming:

$$|D-B|-G_1(|B-A|+|C-B|),$$

where $G_1$ represents a gain factor.

2. The method of claim 1, wherein said method comprises:
    combining pixels in said image in dependence on the output indicating whether said plurality of pixels include one of either computer generated graphics or an image acquired from a physical scene.

3. The method of claim 1, wherein said method comprises:
    blending pixel values in said image in dependence on the output indicating whether said plurality of pixels include one of either computer generated graphics or an image acquired from a physical scene.

4. The method of claim 1, wherein said method comprises:
    combining the plurality of values of adjacent pixels to form a first scaled pixel value.

5. The method of claim 4, wherein said method comprises:
    blending the first scaled pixel value with a second scaled pixel value, wherein the relative contribution of the first pixel value and the second pixel value is adjusted in dependence on the output indicating whether said plurality of pixels include one of either computer generated graphics or an image acquired from a physical scene.

6. The method of claim 1, wherein analyzing comprises forming:

$$|B-C|-G_2(|B-A|+|B-D|) \text{ and}$$

$$|B-C|-G_3(|A-C|+|B-D|),$$

where $G_2$ and $G_3$ represent gain factors.

7. A method of assessing whether a plurality of values of adjacent pixels represents computer generated graphics, comprising:
analyzing said plurality of values to determine if said plurality of values contain frequency components representative of computer generated graphics; and
providing an output indicating whether said plurality of pixels include one of either computer generated graphics or an image acquired from a physical scene based on the frequency content of the plurality of adjacent pixels; and
wherein said analyzing comprises determining if said plurality of values includes a pixel value pattern indicative of one of a step, an impulse, or variations at about the sampling rate of said plurality of values by comparing groups of adjacent ones of said plurality of values to defined patterns representative of a step, an impulse, or variations at about the sampling rate of said plurality of values, each of said groups of adjacent ones of said plurality of values comprises values, A, B, C and D, of four adjacent pixels in said image, and analyzing comprises forming:

$$|B-C|-G_2(|B-A|+|B-D|),$$

where $G_2$ represents a gain factor.

8. The method of claim 7, wherein said method comprises:
combining pixels in said image in dependence on the output indicating whether said plurality of pixels include one of either computer generated graphics or an image acquired from a physical scene.

9. The method of claim 7, wherein said method comprises:
blending pixel values in said image in dependence on the output indicating whether said plurality of pixels include one of either computer generated graphics or an image acquired from a physical scene.

10. The method of claim 7, wherein said method comprises:
combining the plurality of values of adjacent pixels to form a first scaled pixel value.

11. The method of claim 10, wherein said method comprises:
blending the first scaled pixel value with a second scaled pixel value, wherein the relative contribution of the first pixel value and the second pixel value is adjusted in dependence on the output indicating whether said plurality of pixels include one of either computer generated graphics or an image acquired from a physical scene.

12. The method of claim 7, wherein analyzing comprises forming:

$$|D-B|-G_1(|B-A|+|C-B|),$$

where $G_1$ represents a gain factor.

13. The method of claim 7, wherein analyzing comprises forming:

$$|B-C|-G_3(|A-C|+|B-D|),$$

where $G_3$ represents a gain factor.

14. A method of assessing whether a plurality of values of adjacent pixels represents computer generated graphics, comprising:
analyzing said plurality of values to determine if said plurality of values contain frequency components representative of computer generated graphics; and
providing an output indicating whether said plurality of pixels include one of either computer generated graphics or an image acquired from a physical scene based on the frequency content of the plurality of adjacent pixels; and
wherein said analyzing comprises determining if said plurality of values includes a pixel value pattern indicative of one of a step, an impulse, or variations at about the sampling rate of said plurality of values by comparing groups of adjacent ones of said plurality of values to defined patterns representative of a step, an impulse, or variations at about the sampling rate of said plurality of values, each of said groups of adjacent ones of said plurality of values comprises values, A, B, C and D, of four adjacent pixels in said image, and analyzing comprises forming:

$$|B-C|-G_3(|A-C|+|B-D|),$$

where $G_3$ represents a gain factor.

15. The method of claim 14, wherein said method comprises:
combining pixels in said image in dependence on the output indicating whether said plurality of pixels include one of either computer generated graphics or an image acquired from a physical scene.

16. The method of claim 14, wherein said method comprises:
blending pixel values in said image in dependence on the output indicating whether said plurality of pixels include one of either computer generated graphics or an image acquired from a physical scene.

17. The method of claim 14, wherein said method comprises:
combining the plurality of values of adjacent pixels to form a first scaled pixel value.

18. The method of claim 17, wherein said method comprises:
blending the first scaled pixel value with a second scaled pixel value, wherein the relative contribution of the first pixel value and the second pixel value is adjusted in dependence on the output indicating whether said plurality of pixels include one of either computer generated graphics or an image acquired from a physical scene.

19. The method of claim 14, wherein analyzing comprises forming:

$$|D-B|-G_1(|B-A|+|C-B|),$$

where $G_1$ represents a gain factor.

20. The method of claim 14, wherein analyzing comprises forming:

$$|B-C|-G_2(|B-A|+|B-D|),$$

where $G_2$ represents a gain factor.

* * * * *